United States Patent Office 3,254,088
Patented May 31, 1966

3,254,088
MORPHINE DERIVATIVE
Mozes Juda Lewenstein, 80—49 Park Lane, Kew Gardens, Long Island, N.Y., and Jack Fishman, Rego Park, N.Y.; said Fishman assignor to said Lewenstein
No Drawing. Filed Mar. 14, 1961, Ser. No. 95,506
4 Claims. (Cl. 260—285)

This invention relates to new morphine derivatives and has particular relation to N-allyl-14-hydroxydihydro-nor-morphinone and its salts and to a process for preparing the same. The invention also relates to 14-hydroxydihydro-nor-morphinone and its salts.

It has been known that certain morphine derivatives are antagonists against the respiratory depressive action of opium alkaloids, their derivatives and synthetic analgesics. Several such antidotes have been made in the past, such as N-allylnormorphine and levallorphan. We have now found that compounds of this invention, i.e. N-allyl-14-hydroxydihydro-nor-morphinone and its therapeutically applicable salts are more potent antagonists to the respiratory depressive effects of potent analgesics than the antagonists hitherto known. The 14-hydroxydihydro-nor-morphinone has been found to be a potent and effective analgesic.

The following examples describe some specific embodiments of and best modes for preparing the compounds of the invention, to which the invention is not limited.

Example 1

10 grams of 14-hydroxydihydromorphinone was converted into its diacetate by warming it on the steam bath with 80 ccm. of acetic anhydride for about 2 hours. The acetic anhydride was removed on the water bath under a vacuum of about 30 mm. absolute pressure. The melting point of the residue was 220° C. The residue was taken up in 100 ccm. of chloroform. An equal amount by weight of cyanogen bromide was added and the mixture was refluxed at about 60° C. for about 5 hours. After refluxing, the mixture was washed with 100 cc. of a 5% aqueous hydrochloric acid solution, dried over sodium sulfate and the chloroform removed by evaporation under a vacuum of about 30 mm. The residue had a melting point of 240° C.

The residue was then heated at about 90° C. for 16 hours on a steam bath with 300 ccm. of 20% aqueous hydrochloric acid solution, and treated with a small amount, e.g. 1 gram of charcoal. The hydrochloric acid was then removed under a vacuum of 15 mm., the residue dissolved in 30 ccm. of water and precipitated by the addition of 2.4 ccm. of concentrated aqueous ammonia. The precipitate was filtered off and dried. It consists of 14-hydroxydihydro-nor-morphinone. It has no melting point and is soluble in ethanol.

The 14-hydroxydihydro-nor-morphinone was suspended in 200 ccm. of pure ethyl alcohol, half its weight of sodium bicarbonate and half its weight of allyl bromide added and the resulting mixture was refluxed at about 75° C. for 48 hours. The solution was cooled e.g. to 10° C. and filtered and the alcohol removed under a vacuum of 30 mm. The residue was dissolved in chloroform and filtered. The chloroform was removed under a vacuum of 30 mm. and the residue was crystallized from ethylacetate. The crystallized product, N-allyl-14-hydroxydihydro-nor-morphinone, has a melting point of 184° C., is soluble in chloroform and insoluble in petroleum ether. The yield amounts to 20% based on the weight of the reacted 14-hydroxydihydromorphinone.

Calculated for the free base, the N-allyl-hydroxydihydro-nor-morphinone contains C 69.72% and H 6.43%, N 4.28%. Found: C 69.54%, H 6.87%, N 4.43%.

The salts of the new compound can be prepared in conventional manner, e.g. by reacting the base with a substantially equivalent amount of an inorganic or organic acid in aqueous medium and recovering the salt thus formed by crystallization, or precipitation with a suitable water-miscible organic solvent. Or the base and acid are dissolved in a volatile organic solvent and the salt is recovered by evaporation of the solvent.

Example 2

One gram of N-allyl-14-hydroxydihydro-nor-morphinone was dissolved in 50 cc. of ethanol. An equivalent of 6 N hydrochloric acid was added. Addition of ether precipitated the hydrochloric salt which could be crystallized from ethanol-ether.

Example 3

One gram of N-allyl-14-hydroxydihydro-nor-morphinone was dissolved in 50 cc. of ethanol. An equivalent of tartaric acid was added and the solution was warmed. Evaporation of solvent yielded the bitartrate salt which could be crystallized from dilute ethanol.

Salts of 14-hydroxydihydro-nor-morphinone can be prepared substantially in the same manner as described in the above Examples 2 and 3.

As further examples of acids which can be used for preparing salts of the new bases, the following are mentioned: sulfuric acid, phosphoric acid, nitric acid, hydrobromic acid, oxalic acid, maleic acid, succinic acid, benzoic acid, and lactic acid.

The compounds embodying this invention are of low toxicity so that they can be used without the danger of toxic effects when administered to human subjects.

In obtaining the desired antagonizing effects, the compounds of the present invention can be administered prior to or after administration of the analgesics, or in mixture with the analgesics, preferably by intravenous, subcutaneous, or intramuscular injection.

The N-allyl-14-hydroxydihydro-nor-morphinone and its salts are antagonists of unexpectedly high potency against the respiratory depressive action of potent analgesics. For example, the new compounds are about 10 times more potent in antagonistic action than N-allyl-nor-morphine. It has been found that in order to counteract the depression produced by morphine, the action of 0.1 mg. of the compound of this invention per 10 mg. morphine, was sufficient. Furthermore of great importance is the fact that the compounds of this invention act much faster than N-allyl-nor-morphine. In cases of over-doses of narcotic drugs, such as morphine, it often is a matter of the greatest urgency to use a fast acting antagonist and the difference in the onset of action between N-allyl-nor-morphine and the present new compound may make a difference between life and death. In addition the antagonists of this invention are considerably better tolerated by human subjects.

The term "therapeutically applicable salt" is used herein to denote salts in which the acid ingredient of the salt is free of toxicity or other therapeutically harmful or undesired effects.

It will be understood that the process described above is not limited to the specific conditions, steps, amounts and other details specifically described in the above examples and can be carried out with various modifications. For example, in acetylating the starting material, the acetic anhydride can be used in any excess which is conventional in acetylating reactions of this type. The residue obtained by the removal of acetic anhydride can be dissolved in 20 to 100 ccm. chloroform or more. The cyanogenbromide is preferably used in an amount of at least 3 mols for each mol of 14-hydroxydihydromorphinone, but the use of more cyanogenbromide is not necessary or useful. The reaction with cyanogenbromide by refluxing may take place, depending on the solvent, in the range of 30 to 200° C. The residue obtained by washing and drying the refluxed liquid and removing the chloroform is then heated for 4 to 20 hours with 100 to 400 ccm. of 20% aqueous HCl at 60°–100° C. The solution obtained by the removal of the aqueous HCl, and dissolution of the residue in water is precipitated by the addition of 1 to 20 ccm of concentrated aqueous ammonia. The filtered off and dried precipitate is suspended in 50 to 250 ccm. of an alcohol, e.g. ethyl alcohol and is reacted after the addition of sodium bicarbonate and allyl bromide by refluxing at 50–150° C. for 24 to 72 hours. These and similar modifications can be made without departing from the scope of the invention as defined in the appended claims.

What is claimed is:

1. A compound selected from the group consisting of N-allyl-14-hydroxydihydro-nor-morphinone and its therapeutically applicable salts.
2. The compound N-allyl-14-hydroxydihydro-nor-morphinone.
3. A compound consisting of a therapeutically applicable salt of N-allyl-14-hydroxydihydro-nor-morphinone.
4. A compound consisting of the hydrochloric salt of N-allyl-14-hydroxydihydro-nor-morphinone.

References Cited by the Examiner

UNITED STATES PATENTS

| | | | |
|---|---|---|---|
| 2,741,613 | 4/1956 | Clark | 260—285 |
| 2,890,221 | 6/1959 | Rapoport et al. | 260—285 |
| 2,891,954 | 6/1959 | Weylard | 260—285 |

FOREIGN PATENTS 717,008  10/1954  Great Britain.

OTHER REFERENCES

Beilstein: Handbuch der Organischen Chemie, vol 27, Second Work, pages 359–360 (1955).

Winter et al.: Arch. Internat., Pharmacodynamie, vol. 110, pages 186–202 (1957).

HENRY R. JILES, *Acting Primary Examiner.*

IRVING MARCUS, WALTER A. MODANCE,
*Examiners.*

E. F. BERG, DON M. KERR, *Assistant Examiners.*